(12) United States Patent
Itano et al.

(10) Patent No.: US 8,646,853 B2
(45) Date of Patent: Feb. 11, 2014

(54) TRAIN BRAKING DEVICE

(75) Inventors: Yasuharu Itano, Chiyoda-ku (JP);
Hiroshi Yamada, Chiyoda-ku (JP);
Etsuji Matsuyama, Chiyoda-ku (JP);
Hiroshi Yoshikawa, Chiyoda-ku (JP)

(73) Assignee: Mitsubishi Electric Corporation, Chiyoda-Ku, Tokyo (JP)

( * ) Notice: Subject to any disclaimer, the term of this patent is extended or adjusted under 35 U.S.C. 154(b) by 522 days.

(21) Appl. No.: 12/999,207

(22) PCT Filed: Jul. 24, 2008

(86) PCT No.: PCT/JP2008/063308
§ 371 (c)(1),
(2), (4) Date: Dec. 15, 2010

(87) PCT Pub. No.: WO2010/010623
PCT Pub. Date: Jan. 28, 2010

(65) Prior Publication Data
US 2011/0089755 A1 Apr. 21, 2011

(51) Int. Cl.
*B60T 11/20* (2006.01)
(52) U.S. Cl.
USPC ........ 303/14; 303/3; 303/7; 303/15; 303/199; 303/128
(58) Field of Classification Search
USPC .................. 303/3, 7, 14, 15, 20, 128, 199
See application file for complete search history.

(56) References Cited

U.S. PATENT DOCUMENTS 4,598,953 A * 7/1986 Wood et al. ............... 303/3
5,222,788 A * 6/1993 Dimsa et al. .............. 303/15

(Continued)

FOREIGN PATENT DOCUMENTS

JP 56-74701 A 6/1981
JP 4-78069 U 7/1992

(Continued)

OTHER PUBLICATIONS

International Search Report (PCT/ISA/210) issued on Nov. 4, 2008, by Japanese Patent Office as the International Searching Authority for International Application No. PCT/JP2008/063308.

(Continued)

*Primary Examiner* — Thomas J Williams
*Assistant Examiner* — Mariano Sy
(74) *Attorney, Agent, or Firm* — Buchanan Ingersoll & Rooney PC

(57) ABSTRACT

To provide a train braking device including a controller that controls a brake cylinder pressure acting on a brake cylinder based on a service brake command or an emergency brake command, the train braking device includes a supply valve for supplying compressed air to the brake cylinder and an exhaust valve for adjusting a pressure of the supplied compressed air. The controller includes an electromagnetic-valve drive circuit, which includes a first switch circuit that a first switch for slide control is connected in parallel to ends of a serially connected circuit of a first switch for emergency brake and a first switch for service brake control with its one end being connected to a circuit power supply and the other end being connected to the supply valve, and a second switch circuit that a second switch for slide control is connected in parallel to ends of a serially connected circuit of a second switch for emergency brake and a second switch for service brake control with its one end being connected to the first switch circuit and the other end being connected to the exhaust valve.

19 Claims, 7 Drawing Sheets

(56) References Cited

U.S. PATENT DOCUMENTS

| | | | | |
|---|---|---|---|---|
| 5,758,929 | A | * | 6/1998 | Newton et al. .................... 303/3 |
| 5,791,744 | A | * | 8/1998 | Wood et al. ....................... 303/7 |
| 5,887,953 | A | * | 3/1999 | Wood et al. ....................... 303/7 |
| 6,508,519 | B1 | * | 1/2003 | Tate ................................ 303/3 |
| 2004/0046442 | A1 | | 3/2004 | Aurich et al. |

FOREIGN PATENT DOCUMENTS

| | | | |
|---|---|---|---|
| JP | 05-155327 | A | 6/1993 |
| JP | 07-096830 | A | 4/1995 |
| JP | 8-67240 | A | 3/1996 |
| JP | 10-338123 | A | 12/1998 |
| JP | 2001-18784 | A | 1/2001 |

OTHER PUBLICATIONS

Written Opinion (PCT/ISA/237) issued on Nov. 4, 2008, by Japanese Patent Office as the International Searching Authority for International Application No. PCT/JP2008/063308.

Supplemental European Search Report dated Jul. 19, 2011, issued in the corresponding European Application No. 08791560.9-2423.

Office Action (Decision of Patent Grant) dated Jul. 13, 2012, issued in corresponding Korean Patent Application No. 10-2010-7029028. (2 pages).

* cited by examiner

TRAIN BRAKING DEVICE

TECHNICAL FIELD

The present invention relates to a train braking device.

BACKGROUND ART

In a train braking device having an air brake controller, the air brake controller generates a predetermined signal based on a service brake command and an emergency brake command, and an electromagnetic valve generates a pneumatic signal corresponding to the predetermined signal, so that a predetermined brake cylinder force can be obtained.

Conventionally, for example, according to a train braking device described in Patent Document 1, a circuit for service brake control and a circuit for slide control are common in an air brake controller. A circuit for emergency brake is independent of the circuit for service brake control and that for slide control. In this train braking device, while an electromagnetic valve for service brake control and an electromagnetic valve for slide control are common, an electromagnetic valve for emergency brake is independent of the electromagnetic valve for service brake control and that for slide control. With this configuration, the conventional train braking device can generate an emergency brake independent of service brake control and slide control.

Patent Document 1: Japanese Patent Application Laid-open No. 2001-018784

DISCLOSURE OF INVENTION

Problem to be Solved by the Invention

However, according to the train braking device described in Patent Document 1, a plurality of circuits in the air brake controller and a plurality of electromagnetic valves are provided. The time and costs required for manufacturing the device and its maintenance are thus increased and a further improvement in the reliability of an air brake has been difficult.

The present invention has been achieved in view of the above problems and an object of the present invention is to provide a train braking device capable of further improving reliability of an air brake.

Means for Solving Problem

In order to solve the above problem and in order to attain the above object, in a train braking device including a controller that controls a brake cylinder pressure acting on a brake cylinder based on a service brake command or an emergency brake command, the train braking device of the present invention includes an electromagnetic valve unit having a supply valve for supplying supplied compressed air to the brake cylinder and an exhaust valve for adjusting a pressure of the supplied compressed air. Additionally, the controller includes an electromagnetic-valve drive circuit, which has a first switch circuit that a first switch for slide control is connected in parallel to ends of a serially connected circuit of a first switch for emergency brake and a first switch for service brake control with its one end being connected to a circuit power supply and the other end being connected to the supply valve, and a second switch circuit that a second switch for slide control is connected in parallel to ends of a serially connected circuit of a second switch for emergency brake and a second switch for service brake control with its one end being connected to the other end of the first switch circuit and the other end being connected to the exhaust valve.

Effect of the Invention

The train braking device according to the present invention includes a supply valve and an exhaust valve connected to two switch circuits that a switch for slide control is connected in parallel to a serially connected circuit of a switch for emergency brake and a switch for service brake control, and the exhaust valve is operated in cooperation with the supply valve. With this configuration, the reliability of an air brake can be further improved.

Figure 1:
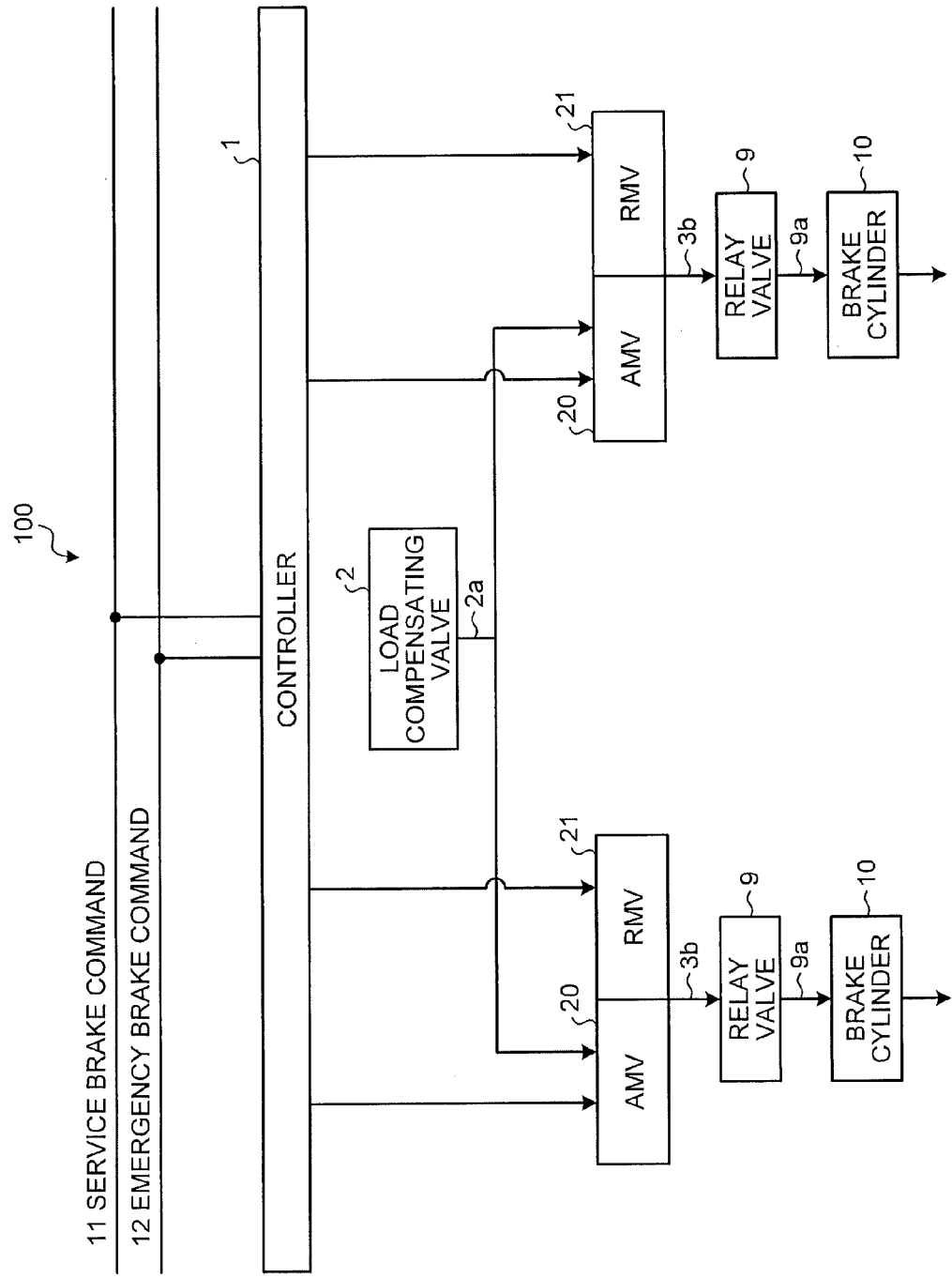
FIG. 1 is an example of a configuration of a train braking device according to a first embodiment.

EXPLANATIONS OF LETTERS OR NUMERALS 1 controller
1a, 1b, 1c, 1d, 1e electromagnetic-valve drive circuit
2 load compensating valve
2a output pressure
3b pressure control signal
4 AMVH
5 AMVL
6 RMVH
7 RMVL
9 relay valve
9a brake cylinder pressure
10 brake cylinder
11 service brake command
12 emergency brake command
20 AMV
21 RMV
50 logic table
71 First temperature sensor A
72 Second temperature sensor B
73 analog input circuit A
74 analog input circuit B
75 A/D converter A
76 A/D converter B
77 IO logic IC
78 stall detector
79 digital input/output circuit
80 heater
100, 300 train braking device
S1, S2 contact for H/W timer
SW1, SW4 switch for slide control
SW2, SW5 switch for emergency brake
SW3, SW6 switch for service brake control
P circuit power supply

BEST MODE(S) FOR CARRYING OUT THE INVENTION

Exemplary embodiments of a train braking device according to the present invention will be explained below in detail with reference to the accompanying drawings. The present invention is not limited thereto.

First Embodiment

FIG. 1 is an example of a configuration of a train braking device according to a first embodiment of the present invention. A train braking device 100 shown in FIG. 1 includes, as its main constituent units, a controller 1, a load compensating valve 2, an AMV (Apply Magnet Valve: supply valve) 20, an RMV (Release Magnet Valve: exhaust valve) 21, a relay valve 9, and a brake cylinder 10. The constituent units connected to the controller 1 are shown so as to be symmetrical to each other with respect to the load compensating valve 2. This is because a first constituent unit connected to the controller 1 controls a brake of first carriage of each vehicle and a second constituent unit controls a brake of a second carriage.

The controller 1 receives a service brake command 11 transmitted from a brake command unit. The controller 1 also receives an emergency brake command 12 by a different line from that of the service brake command 11.

The load compensating valve 2 is arranged at front and rear carriages of each vehicle and supplies an output pressure 2a of compressed air directly to the relay valve 9 for generating an emergency brake.

The AMV 20 supplies the output pressure 2a of the supplied compressed air to the brake cylinder 10. The RMV 21 adjusts the output pressure 2a of the supplied compressed air. A constituent unit of the AMV 20 and the RMV 21 is called an electromagnetic valve unit.

The relay valve 9 is used to improve the response of a brake cylinder pressure 9a and amplifies compressed air supplied from the AMV 20 and the RMV 21 (hereinafter, "pressure control signal") 3b so as to have a predetermined pressure. An air tank (not shown) is connected to the relay valve 9. Because compressed air is reserved in the air tank, the relay valve 9 can amplify the pressure control signal 3b to generate the brake cylinder pressure 9a for operating the brake cylinder 10.

Figure 2:
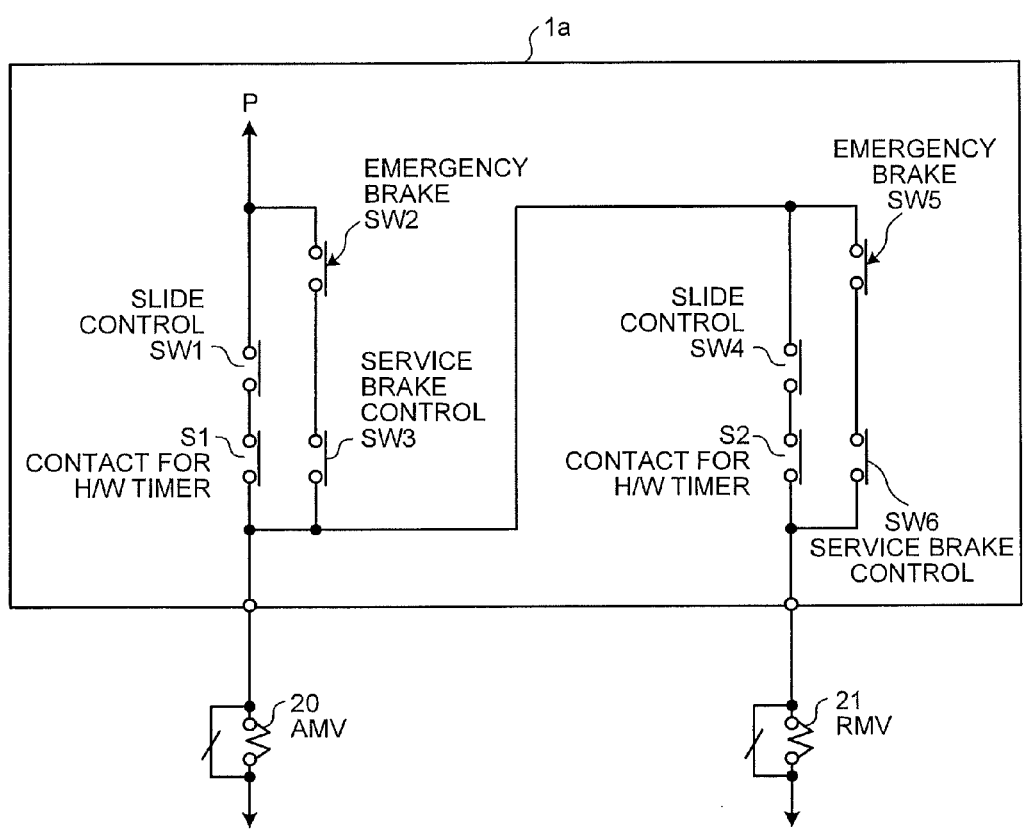
FIG. 2 is an example of a configuration of an electromagnetic-valve drive circuit according to the first embodiment.

FIG. 2 is an example of a configuration of an electromagnetic-valve drive circuit according to the first embodiment. An electromagnetic-valve drive circuit 1a is a part of an internal circuit in the controller 1 and is a circuit that drives the AMV 20 and the RMV 21.

The electromagnetic-valve drive circuit 1a includes, as its main constituent units, a first switch SW1 for slide control, a second switch SW4 for slide control, a first switch SW2 for emergency brake, a second switch SW5 for emergency brake, a first switch SW3 for service brake control, a second switch SW6 for service brake control, a contact S1 for an H/W timer, a contact S2 for an H/W timer, and a circuit power supply P. The AMV 20 and the RMV 21 correspond to the AMV 20 and the RMV 21 shown in FIG. 1. The contact S1 for an H/W timer and the contact S2 for an H/W timer suspend a wheel slide control safety function and a wheel slide control operation to protect electromagnetic valves from excessive abrasion and recover the wheel slide control without stopping a train.

The electromagnetic-valve drive circuit 1a includes a first switch circuit that the first switch SW1 for slide control or a serially connected circuit of the first switch SW1 for slide control and the contact S1 for an H/W timer is connected in parallel to ends of a serially connected circuit of the first switch SW2 for emergency brake and the first switch SW3 for service brake control. The electromagnetic-valve drive circuit 1a also includes a second switch circuit that the second switch SW4 for slide control or a serially connected circuit of the second switch SW4 for slide control and the contact S2 for an H/W timer is connected in parallel to ends of a serially connected circuit of the second switch for emergency brake and the second switch for service brake control. While a serially connected circuit of a switch for emergency brake and a switch for service brake control is shown as an example, the switch included in the serially connected circuit is not limited to only the switch for emergency brake and the switch for service brake control.

One end of the first switch circuit is connected to the circuit power supply P and the other end is connected to the AMV 20. One end of the second switch circuit is connected to the first switch circuit and the other end is connected to the RMV 21.

Such a configuration allows slide control to be independent of emergency braking and service brake control and the RMV 21 to be driven in cooperation with the AMV 20. For example, when a contact of the first switch SW1 for slide control is closed, a current of the circuit power supply P is supplied to the second switch circuit and the second switch circuit can drive the RMV 21.

Operations of the switches shown in FIG. 2 are explained below. When the service brake command 11 is outputted, the first switch SW1 for slide control and the second switch SW4 for slide control are open. Because the emergency brake command 12 is always a pressurization command, the first switch SW2 for emergency brake and the second switch SW5 for emergency brake are normally closed.

A predetermined logic table is set in the controller 1 in advance, and the controller 1 opens or closes the first switch SW3 for service brake control and the second switch SW6 for service brake control based on the logic table. In the logic table, a second mode of supplying compressed air and a fifth mode of exhausting compressed air are defined so that the brake cylinder pressure 9a necessary for service brake control, slide control, and emergency brake output can be obtained. The logic table is used to control the AMV 20 or the RMV 21 in a pressurized or unpressurized manner.

When the emergency brake command 12 is outputted, the electromagnetic-valve drive circuit 1a forcibly opens the first switch SW2 for emergency brake and the second switch SW5 for emergency brake. Because the first switch SW1 for slide control and the second switch SW4 for slide control are open, all of the electromagnetic valves become unpressurized because the circuit power supply P is not supplied thereto. The train braking device 100 then supplies the output pressure 2a from the load compensating valve 2 to the relay valve 9 to generate an emergency brake.

When a slide occurs, the first switch SW2 for emergency brake and the second switch SW5 for emergency brake are normally closed. The first switch SW3 for service brake control and the second switch SW6 for service brake control are open. The electromagnetic-valve drive circuit 1a opens or closes the first switch SW1 for slide control and the second switch SW4 for slide control based on the logic table to drive the AMV 20 or the RMV 21.

When slide control cannot be performed for some reason, by stall detection, the electromagnetic-valve drive circuit 1a can perform service brake control or generate an emergency brake although the first switch SW1 for slide control and the second switch SW4 for slide control are opened.

As described above, according to the train braking device 100 of the first embodiment, the electromagnetic-valve drive circuit 1a that includes the first switch circuit and the second switch circuit makes the RMV 21 cooperate with the AMV 20. Unlike conventional train braking devices, without using emergency electromagnetic valves and switching electromagnetic valves and without separating a circuit for emergency brake from a switch for slide control and for service brake, emergency braking, slide control, and service brake control can be performed. Further, because the emergency electromagnetic valve is not required, the train braking device 100 can be made compact and lightweight, materials for the device can be reduced, and costs can be saved. Because the number of parts is reduced, the reliability of the train braking device 100 is improved and it can be used for a long period of time.

Second Embodiment

A train braking device 300 according to a second embodiment uses four types of magnet valves for controlling the brake cylinder pressure 9a finely.

Figure 3:
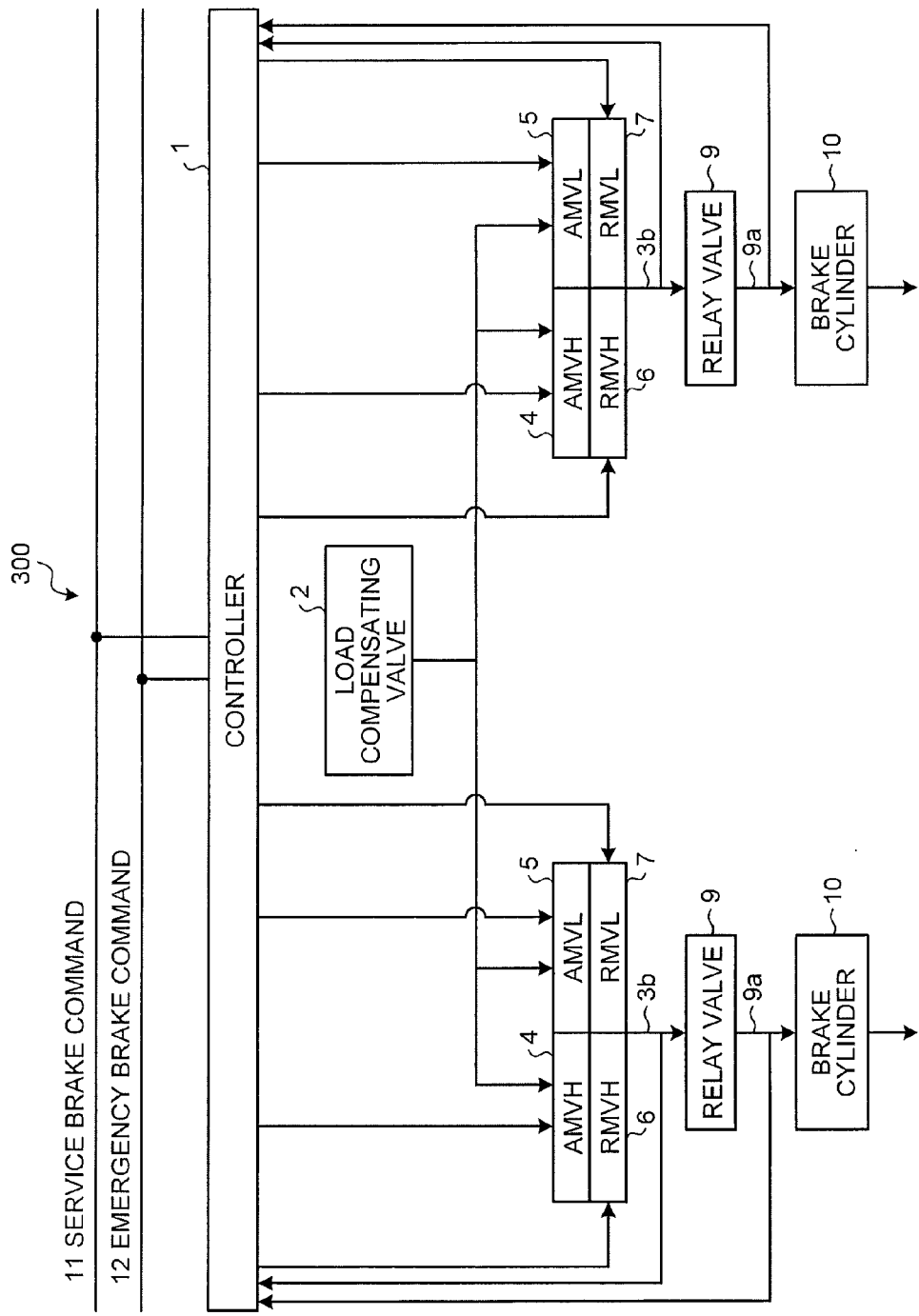
FIG. 3 is an example of a configuration of a train braking device according to a second embodiment.

FIG. 3 is an example of a configuration of the train braking device according to the second embodiment. The train braking device 300 shown in FIG. 3 includes, as its main constituent units, the controller 1, the load compensating valve 2, an AMVH (Apply Magnet Valve High: first supply valve) 4, an AMVL (Apply Magnet Valve Low: second supply valve) 5, an RMVH (Release Magnet Valve High: first exhaust valve) 6, an RMVL (Release Magnet Valve Low: second exhaust valve) 7, the relay valve 9, and the brake cylinder 10.

The AMVH 4 supplies the output pressure 2a of supplied compressed air to the brake cylinder 10. The RMVH 6 adjusts the output pressure 2a of the supplied compressed air. The AMVL 5 supplies the output pressure 2a of the compressed air so as to be lower than that of the AMVH 4. The RMVL 7 adjusts the output pressure 2a of the compressed air so as to be lower than that of the RMVH 6.

The relay valve 9 is used to improve the response of the brake cylinder pressure 9a and amplifies the pressure control signal 3b supplied from the AMVH 4, the AMVL 5, the RMVH 6, and the RMVL 7 so as to have a predetermined pressure.

Figure 4:
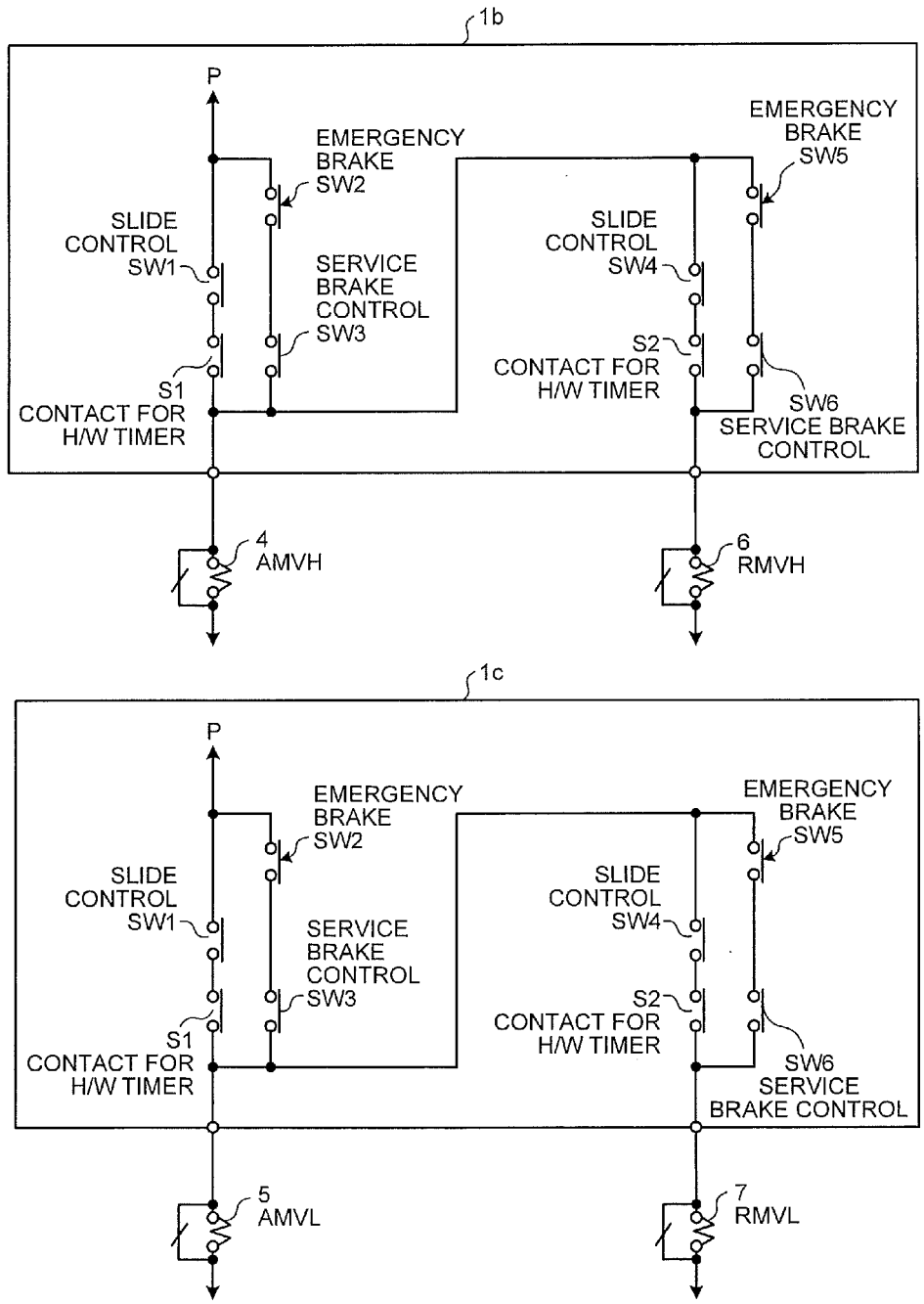
FIG. 4 is an example of a configuration of an electromagnetic-valve drive circuit according to the second embodiment.

FIG. 4 is an example of a configuration of an electromagnetic-valve drive circuit according to the second embodiment. A first electromagnetic-valve drive circuit 1b and a second electromagnetic-valve drive circuit 1c are a part of an internal circuit of the controller 1 and for driving the AMVH 4, the AMVL 5, the RMVH 6, and the RMVL 7.

Each of the first electromagnetic-valve drive circuit 1b and the second electromagnetic-valve drive circuit 1c includes, as its main constituent units, the first switch SW1 for slide control, the second switch SW4 for slide control, the first switch SW2 for emergency brake, the second switch SW5 for emergency brake, the first switch SW3 for service brake control, the second switch SW6 for service brake control, the contact S1 for an H/W timer, the contact S2 for an H/W timer, and the circuit power supply P. The AMVH 4, the AMVL 5, the RMVH 6, and the RMVL 7 shown in FIG. 4 correspond to the AMVH 4, the AMVL 5, RMVH 6, and the RMVL 7 shown in FIG. 3, respectively.

Each of the first electromagnetic-valve drive circuit 1b and the second electromagnetic-valve drive circuit 1c includes a first switch circuit that the first switch SW1 for slide control or a serially connected circuit of the first switch SW1 for slide control and the contact S1 for an H/W timer is connected in parallel to ends of a serially connected circuit of the first switch SW2 for emergency brake and the first switch SW3 for service brake control. Each of the first electromagnetic-valve drive circuit 1b and the second electromagnetic-valve drive circuit 1c also includes a second switch circuit that the second switch SW4 for slide control or a serially connected circuit of the second switch SW4 for slide control and the contact S2 for an H/W timer is connected in parallel to ends of a serially connected circuit of the second switch for emergency brake and the second switch for service brake control. While the serially connected circuit constituted by only the switch for emergency brake and the switch for service brake control is shown as an example, the present invention is not limited thereto.

In the first electromagnetic-valve drive circuit 1b, one end of the first switch circuit is connected to the circuit power supply P and the other end is connected to the AMVH 4. One end of the second switch circuit is connected to the first switch circuit and the other end is connected to the RMVH 6. Thus, the first electromagnetic-valve drive circuit 1b can cause slide control to be independent of emergency braking and service brake control and drive the RMVH 6 in cooperation with the AMVH 4. For example, a contact of the first switch SW1 for slide control is closed, a current of the circuit power supply P is supplied to the second switch circuit and the second switch circuit can drive the RMVH 6.

In the second electromagnetic-valve drive circuit 1c, one end of the first switch circuit is connected to the circuit power supply P and the other end is connected to the AMVL 5. One end of the second switch circuit is connected to the first switch circuit and the other end is connected to the RMVL 7. With this configuration, the second electromagnetic-valve drive circuit 1c can cause slide control to be independent of emergency braking and service brake control and drive the RMVL 7 in cooperation with the AMVL 5. For example, when a contact of the first switch SW1 for slide control is closed, the current of the circuit power supply P is supplied to the second switch circuit and the second switch circuit can drive the RMVL 7.

The train braking device 300 feeds back the pressure control signal 3b and the brake cylinder pressure 9a to the controller 1. Therefore, the controller 1 drives the AMVH 4, the AMVL 5, the RMVH 6, and the RMVL 7 while recognizing states of the pressure control signal 3b and the brake cylinder pressure 9a.

Figure 6:
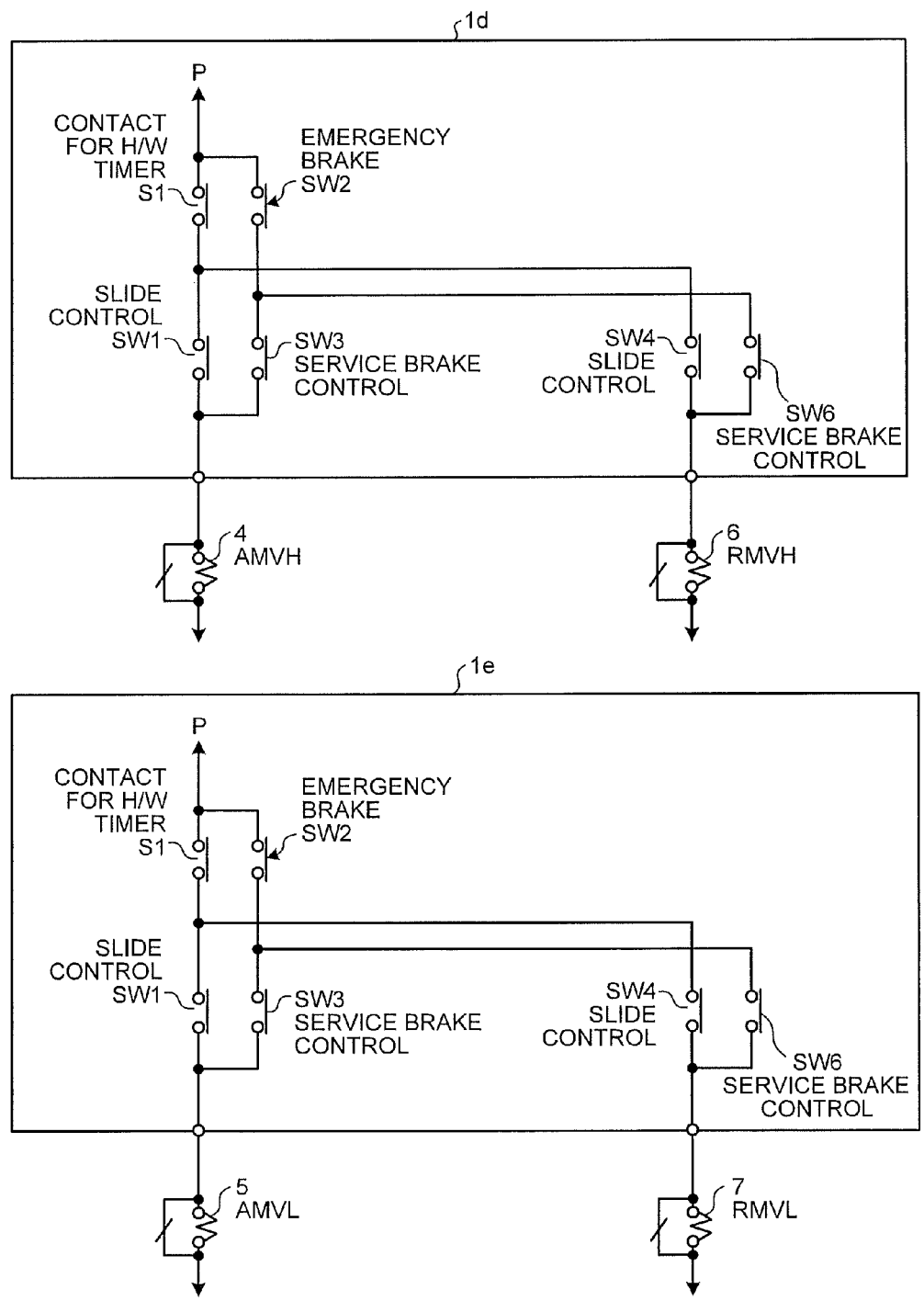
FIG. 6 is an example of an electromagnetic-valve drive circuit with a simplified circuit configuration.

FIG. 6 is an example of an electromagnetic-valve drive circuit having a simplified circuit configuration. A first electromagnetic-valve drive circuit 1d and a second electromagnetic-valve drive circuit 1e shown in FIG. 6 are obtained by removing the second switch SW5 for emergency brake shown in FIG. 4. Because a connected portion of the first switch SW2 for emergency brake and the first switch SW3 for service brake control is connected to the second switch SW6 for service brake control and the first switch SW1 for slide control is connected to the second switch SW4 for slide control, an emergency brake can be generated only by the switch SW2 for emergency brake. As a result, the circuit configuration can be simplified and at the time of emergency braking, the AMVH 4, the AMVL 5, the RMVH 6, and the RMVL 7 can be unpressurized in a synchronized manner. The electromagnetic-valve drive circuit 1a according to the first embodiment can be also simplified in a similar manner.

Figure 5:
FIG. 5 is an example of a logic table.

FIG. 5 is an example of a logic table. A logic table 50 is set in the controller 1 in advance, and is used to adjust a magnitude of supply and exhaust of compressed air by combining operations of the AMVH 4, the AMVL 5, the RMVH 6, and the RMVL 7.

The logic table 50 is constituted by an item indicating the name of each electromagnetic valve and an item indicating the magnitude of supply and exhaust of compressed air. For example, the AMVH 4, the AMVL 5, the RMVH 6, and the RMVL 7 are shown in the item indicating the name of each electromagnetic valve. For example, a first mode, a second mode, a third mode, a fourth mode, a fifth mode, a sixth mode, and a seventh mode are shown in the item indicating the magnitude of supply and exhaust of compressed air.

In the table, "o" means that each electromagnetic valve is in a pressurized state and "x" means that each electromagnetic valve is in an unpressurized state. The items shown in FIG. 5 are merely examples and the type and the number of items are not limited thereto. The items in the logic table and operations of the respective electromagnetic valves are explained below.

The first mode indicates a released state of a service brake. When all of the electromagnetic valves are in a pressurized state "o", the AMVH 4 and the AMVL 5 are closed and the RMVH 6 and the RMVL 7 are open.

In the second mode, the output pressure 2a of compressed air is supplied. When only the AMVL 5 is in the pressurized state "o", the AMVH 4 is open and the AMVL 5, the RMVH 6, and the RMVL 7 are closed.

In the third mode, the output pressure 2a of compressed air is supplied moderately as compared to the second mode and the service brake is "finely adjusted". When only the AMVH 4 is in the pressurized state "o", the AMVL 5 is open and the AMVH 4, the RMVH 6, and the RMVL 7 are closed.

In the fourth mode, supply and exhaust of the output pressure 2a of compressed air are stopped, so that the service brake is maintained at a certain state. When the AMVH 4 and the AMVL 5 are in the pressurized state "o", all of the electromagnetic valves are closed.

In the fifth mode, the output pressure 2a of compressed air is exhausted. When only the RMVL 7 is in an unpressurized state "x", the RMVH 6 is open and the AMVH 4, the AMVL 5, and the RMVL 7 are closed.

In the sixth mode, the output pressure 2a of compressed air is exhausted moderately as compared to the fifth mode. When only the RMVH 6 is in the unpressurized state "x", the RMVL 7 is open and the AMVH 4, the AMVL 5, and the RMVH 6 are closed.

In the seventh mode, all of the electromagnetic valves are unpressurized and an emergency brake is generated. When all of the electromagnetic valves are in the unpressurized state "x", the AMVH 4 and the AMVL 5 are open and the RMVH 6 and the RMVL 7 are closed.

Operations of the respective switches shown in FIG. 4 are explained below. When the service brake command 11 is outputted, the first switch SW1 for slide control and the second switch SW4 for slide control are open. Because the emergency brake command 12 is always a pressurization command, the first switch SW2 for emergency brake and the second switch SW5 for emergency brake are normally closed. The first electromagnetic-valve drive circuit 1b or the second electromagnetic-valve drive circuit 1c thus opens or closes the first switch SW3 for service brake control and the second switch SW6 for service brake control based on the logic table 50 to drive the AMVH 4, the AMVL 5, the RMVH 6, and the RMVL 7.

When the emergency brake command 12 is generated, the first electromagnetic-valve drive circuit 1b or the second electromagnetic-valve drive circuit 1c forcibly opens the first switch SW2 for emergency brake and the second switch SW5 for emergency brake to release the circuit power supply P used for service brake control.

Because the first switch SW1 for slide control and the second switch SW4 for slide control are open, all of the electromagnetic valves are unpressurized. The train braking device 300 then supplies the output pressure 2a of compressed air from the load compensating valve 2 to the relay valve 9 to generate an emergency brake.

When a slide occurs, the first switch SW2 for emergency brake and the second switch SW5 for emergency brake are closed. The first switch SW3 for service brake control and the second switch SW6 for service brake control are open. The first electromagnetic-valve drive circuit 1b or the second electromagnetic-valve drive circuit 1c opens or closes the first switch SW1 for slide control and the second switch SW4 for slide control based on the logic table 50 to drive the AMVH 4, the AMVL 5, the RMVH 6, and the RMVL 7.

Further, the pressure control signal 3b outputted by the AMVH 4, the AMVL 5, the RMVH 6, and the RMVL 7 and the brake cylinder pressure 9a outputted by the relay valve 9 are fed back to the controller 1 for re-adhering wheels.

When slide control cannot be performed because of an abnormality of a CPU or the like, the first switch SW1 for slide control and the second switch SW4 for slide control are opened by stall detection; however, service brake control or emergency braking can be operated.

When a variation in the pressure control signal 3b is within a tolerance but a hysteresis loss is generated between the pressure control signal 3b and the brake cylinder pressure 9a, an appropriate brake force cannot be obtained. The first electromagnetic-valve drive circuit 1b or the second electromagnetic-valve drive circuit 1c then corrects hysteresis in the third mode or the sixth mode of the logic table 50 by using the brake cylinder pressure 9a as a reference.

For example, the controller 1 uses the pressure control signal 3b which is inputted to the relay valve 9 and indicates the pressure of compressed air and the brake cylinder pressure 9a outputted from the relay valve 9 to control the first electromagnetic-valve drive circuit 1b and the second electromagnetic-valve drive circuit 1c and reduces a hysteresis loss so as to approximate the brake cylinder pressure 9a determined according to the pressure of compressed air inputted to the relay valve 9.

As described above, the train braking device 300 according to the second embodiment uses four types of magnet valves to adjust the brake cylinder pressure 9a finely. Therefore, as compared to conventional train braking devices, the precision of service brake control and slide control can be improved. Because the circuit configuration of the controller 1 is simplified, the train braking device 300 can be made compact, materials for the device can be reduced, and costs can be saved. Further, because the number of parts is reduced, the reliability of the train braking device 300 is improved and it can be used for a long period of time.

Third Embodiment

According to a train braking device of a third embodiment, a temperature sensor and a heater are arranged adjacent to an electromagnetic valve for improving the reliability of the electromagnetic valve and the temperature of the electromagnetic valve can be managed. The train braking device according to the third embodiment corresponds to both the train braking device 100 and the train braking device 300.

Figure 7:
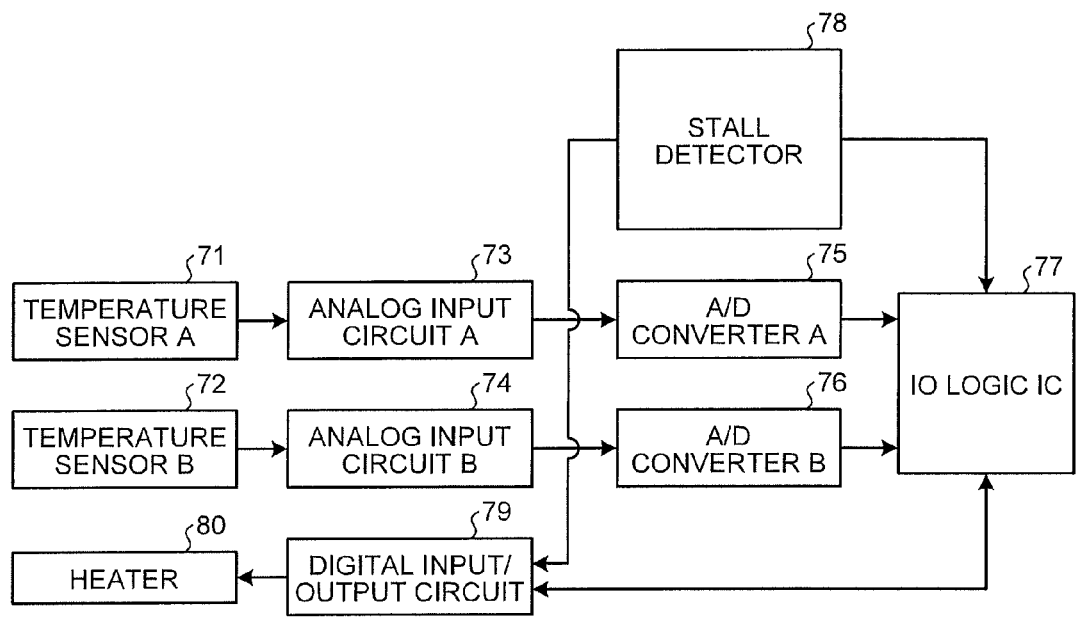
FIG. 7 is an example of a block diagram of a temperature control circuit of an electromagnetic valve.

FIG. 7 is an example of a block diagram of a temperature control circuit of the electromagnetic valve. The temperature control circuit includes, as its main constituent units, a first temperature sensor A 71, a second temperature sensor B 72, an analog input circuit A 73, an analog input circuit B 74, an A/D converter A 75, an A/D converter B 76, an 10 logic IC 77, a stall detector 78, a digital input/output circuit 79, and a heater 80.

The first temperature sensor A 71 measures the temperature of the electromagnetic valve unit or around the electromagnetic valve unit and always measures these temperatures. The second temperature sensor B 72 is arranged at the electromagnetic valve unit or around the electromagnetic valve unit like the first temperature sensor A 71 and monitors whether the value of the first temperature sensor A 71 is normal.

When a difference in temperature between the first temperature sensor A 71 and the second temperature sensor B 72 is small, such as 2° C. or lower, and when a temperature within a casing is low, such as 10° C. or lower, the train braking device 100 or the train braking device 300 turns on the heater 80 for heating the electromagnetic valve.

When the temperature within a casing is high, such as 15° C. or higher, the heater 80 is turned off for stabilizing the operation of the electromagnetic valve. Further, when an abnormality occurs in a CPU, the heater is turned off by the stall detector 78 to suppress an increase in temperature within a casing. The number of the first temperature sensor A 71 and the second temperature sensor B 72 and devices for the respective temperature sensors are not limited to two, respectively and more first temperature sensors A 71 and more second temperature sensors B 72 can be arranged for performing finer temperature control.

As described above, according to the temperature control circuit of the third embodiment, the temperature around the electromagnetic valve can be maintained to be a normal temperature. Therefore, the electromagnetic valve can be used for a longer time of period as compared to conventional cases. Further, because abnormal heat generation of the electromagnetic valve can be detected, the reliability of the train braking device can be improved.

INDUSTRIAL APPLICABILITY

As described above, the train braking device of the present invention is useful as a train braking device that controls a brake cylinder pressure.

The invention claimed is:

1. A train braking device including a controller that controls a brake cylinder pressure acting on a brake cylinder based on a service brake command or an emergency brake command, the train braking device comprising
an electromagnetic valve unit including a supply valve for supplying supplied compressed air to the brake cylinder and an exhaust valve for adjusting a pressure of the supplied compressed air, wherein
the controller includes an electromagnetic-valve drive circuit, said electromagnetic-valve drive circuit:
a first switch circuit wherein a first switch for slide control is connected in parallel to ends of a serially connected circuit of a first switch for emergency brake and a first switch for service brake control, with one end of the first switch circuit being connected to a circuit power supply and an other end of the first switch circuit being connected to the supply valve; and
a second switch circuit wherein a second switch for slide control is connected in parallel to ends of a serially connected circuit of a second switch for emergency brake and a second switch for service brake control, with one end of the second switch circuit being connected to the other end of the first switch circuit and an other end of the second switch circuit being connected to the exhaust valve.

2. The train braking device according to claim 1, wherein the supply valve is constituted by a first supply valve and a second supply valve, and the exhaust valve is constituted a first exhaust valve and a second exhaust valve, and the electromagnetic-valve drive circuit includes:
a first electromagnetic-valve drive circuit that the other end of the first switch circuit is connected to the first supply valve for supplying the compressed air and the other end of the second switch circuit is connected to the first exhaust valve for exhausting the compressed air; and
a second electromagnetic-valve drive circuit that the other end of the first switch circuit is connected to the second supply valve for supplying compressed air more moderately than the first supply valve and the other end of the second switch circuit is connected to the second exhaust valve for exhausting compressed air more moderately than the first exhaust valve.

3. The train braking device according to claim 2, wherein in addition to a first mode indicating a released state of a service brake and a fourth mode of stopping supply and exhaust of the compressed air, a second mode of supplying the compressed air, a third mode of supplying the compressed air more moderately than the second mode, a fifth mode of exhausting the compressed air, and a sixth mode of exhausting the compressed air more moderately than the fifth mode are defined, and
when the third mode is operated, the controller controls only the first supply valve connected to the first switch circuit in the first electromagnetic-valve drive circuit to be in a pressurized state, and
when the sixth mode is operated, the controller controls only the first exhaust valve connected to the second switch circuit in the first electromagnetic-valve drive circuit to be in an unpressurized state.

4. The train braking device according to claim 2, further comprising a relay valve for generating the brake cylinder pressure according to the compressed air supplied from the electromagnetic valve unit, wherein
the electromagnetic valve unit adjusts a pressure of compressed air to be supplied to the relay valve, and
the controller controls a first electromagnetic-valve drive circuit and a second electromagnetic-valve drive circuit so as to approximate a value of a brake cylinder pressure determined by a pressure of the compressed air inputted to the relay valve by using a pressure of the compressed air inputted to the relay valve and the brake cylinder pressure outputted from the relay valve.

5. The train braking device according to claim 1, wherein the electromagnetic-valve drive circuit closes the switch for service brake control when the service brake command is outputted and opens the switch for service brake control when the service brake command is not outputted.

6. The train braking device according to claim 1, wherein the electromagnetic-valve drive circuit opens the switch for slide control when a slide occurs and closes the switch for slide control when a slide does not occur.

7. The train braking device according to claim 1, further comprising a temperature control circuit that includes a first temperature sensor for measuring a temperature of the electromagnetic valve unit or around the electromagnetic valve unit, a second temperature sensor for monitoring the first temperature sensor, and a heater for adjusting a temperature of the electromagnetic valve unit or around the electromagnetic valve unit, wherein the temperature control circuit controls the heater according to a predetermined difference between a value of the first temperature sensor and a value of the second temperature sensor.

8. The train braking device according to claim 3, further comprising a relay valve for generating the brake cylinder pressure according to the compressed air supplied from the electromagnetic valve unit, wherein
the electromagnetic valve unit adjusts a pressure of compressed air to be supplied to the relay valve, and
the controller controls a first electromagnetic-valve drive circuit and a second electromagnetic-valve drive circuit so as to approximate a value of a brake cylinder pressure determined by a pressure of the compressed air inputted to the relay valve by using a pressure of the compressed air inputted to the relay valve and the brake cylinder pressure outputted from the relay valve.

9. The train braking device according to claim 2, wherein the electromagnetic-valve drive circuit closes the switch for service brake control when the service brake command is outputted and opens the switch for service brake control when the service brake command is not outputted.

10. The train braking device according to claim 3, wherein the electromagnetic-valve drive circuit closes the switch for service brake control when the service brake command is outputted and opens the switch for service brake control when the service brake command is not outputted.

11. The train braking device according to claim 4, wherein the electromagnetic-valve drive circuit closes the switch for service brake control when the service brake command is outputted and opens the switch for service brake control when the service brake command is not outputted.

12. The train braking device according to claim 2, wherein the electromagnetic-valve drive circuit opens the switch for slide control when a slide occurs and closes the switch for slide control when a slide does not occur.

13. The train braking device according to claim 3, wherein the electromagnetic-valve drive circuit opens the switch for slide control when a slide occurs and closes the switch for slide control when a slide does not occur.

14. The train braking device according to claim 4, wherein the electromagnetic-valve drive circuit opens the switch for slide control when a slide occurs and closes the switch for slide control when a slide does not occur.

15. The train braking device according to claim 2, further comprising a temperature control circuit that includes a first temperature sensor for measuring a temperature of the electromagnetic valve unit or around the electromagnetic valve unit, a second temperature sensor for monitoring the first temperature sensor, and a heater for adjusting a temperature of the electromagnetic valve unit or around the electromagnetic valve unit, wherein
the temperature control circuit controls the heater according to a predetermined difference between a value of the first temperature sensor and a value of the second temperature sensor.

16. The train braking device according to claim 3, further comprising a temperature control circuit that includes a first temperature sensor for measuring a temperature of the electromagnetic valve unit or around the electromagnetic valve unit, a second temperature sensor for monitoring the first temperature sensor, and a heater for adjusting a temperature of the electromagnetic valve unit or around the electromagnetic valve unit, wherein
the temperature control circuit controls the heater according to a predetermined difference between a value of the first temperature sensor and a value of the second temperature sensor.

17. The train braking device according to claim 4, further comprising a temperature control circuit that includes a first temperature sensor for measuring a temperature of the electromagnetic valve unit or around the electromagnetic valve unit, a second temperature sensor for monitoring the first temperature sensor, and a heater for adjusting a temperature of the electromagnetic valve unit or around the electromagnetic valve unit, wherein
the temperature control circuit controls the heater according to a predetermined difference between a value of the first temperature sensor and a value of the second temperature sensor.

18. The train braking device according to claim 5, further comprising a temperature control circuit that includes a first temperature sensor for measuring a temperature of the electromagnetic valve unit or around the electromagnetic valve unit, a second temperature sensor for monitoring the first temperature sensor, and a heater for adjusting a temperature of the electromagnetic valve unit or around the electromagnetic valve unit, wherein
the temperature control circuit controls the heater according to a predetermined difference between a value of the first temperature sensor and a value of the second temperature sensor.

19. The train braking device according to claim 6, further comprising a temperature control circuit that includes a first temperature sensor for measuring a temperature of the electromagnetic valve unit or around the electromagnetic valve unit, a second temperature sensor for monitoring the first temperature sensor, and a heater for adjusting a temperature of the electromagnetic valve unit or around the electromagnetic valve unit, wherein
the temperature control circuit controls the heater according to a predetermined difference between a value of the first temperature sensor and a value of the second temperature sensor.

\* \* \* \* \*